US006411056B1

United States Patent
Ikedo et al.

(10) Patent No.: US 6,411,056 B1
(45) Date of Patent: Jun. 25, 2002

(54) SYSTEM AND METHOD FOR STABILIZING DISK DRIVE ROTATION CONTROL

(75) Inventors: Gaku Ikedo, Chiqasaki; Naoyuki Kagami; Akinori Yuba, both of Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/670,770

(22) Filed: Sep. 27, 2000

(30) Foreign Application Priority Data

Sep. 27, 1999 (JP) .............................. 11-273327

(51) Int. Cl.$^7$ .............................................. G05B 11/18
(52) U.S. Cl. .................. 318/597; 318/254; 318/138; 318/439; 318/811; 318/433; 318/432
(58) Field of Search ................. 318/254, 432, 318/433, 439, 811, 597; 327/140, 170

(56) References Cited

U.S. PATENT DOCUMENTS

| | | | | |
|---|---|---|---|---|
| 5,780,986 A | * | 7/1998 | Shelton et al. | ............... 318/432 |
| 5,869,946 A | * | 2/1999 | Carobolante | ................ 318/811 |
| 6,072,289 A | * | 6/2000 | Li | .............................. 318/254 |
| 6,084,378 A | * | 7/2000 | Carobolante | ................ 318/811 |
| 6,137,329 A | * | 10/2000 | Kardash | ..................... 327/170 |
| 6,163,120 A | * | 12/2000 | Menegoli | .................... 318/254 |

* cited by examiner

Primary Examiner—Karen Masih
(74) Attorney, Agent, or Firm—Abdy Raissinia; Bracewell & Patterson, L.L.P.

(57) ABSTRACT

A system and method for providing rotation control stability within a disk drive. In accordance with the system of the present invention, a disk storage medium on which information is recorded is driven to rotate by a multiphase-phase DC servomotor. An actuator is utilized for loading and unloading the head to and from the disk storage medium. A load/unload controller commands the actuator to load or unload said head. In order to effectively compensate for an abrupt change in load on the servomotor caused by loading the head onto the disk storage medium, a slew rate switching unit is utilized to alter a slew rate of current supplied to the three-phase DC servomotor, based on a loading start command issued by the load/unload controller.

8 Claims, 6 Drawing Sheets

Slew rate without control

High slew rate

Middle slew rate

Low slew rate

SYSTEM AND METHOD FOR STABILIZING DISK DRIVE ROTATION CONTROL

BACKGROUND OF THE INVENTION

1. Technical Field

The present invention relates to controlling a disk drive and, in particular to a system and method for stabilizing rotation control for a hard disk drive (HDD). More particularly, the present invention relates to a disk drive control system suitable for dynamically adjusting a slew of a HDD servo motor current such that a rotation control of a servo motor driving a storage disk is stabilized during periods of varying servo motor load.

2. Description of the Related Art

During operation a disk drive, a disk storage medium such as a magnetic disk rotates at high speeds thus creating an air bearing (a thin cushion of air) on which a head slider "flies." The head slider is mounted on a suspension assembly constituting a head arm of an actuator mechanism, and is floated off the disk surface from which the head writes or reads out data to or from the storage medium. For one type of HDD, during non-activated periods in which rotation of the storage medium is stopped, the head slider lands on a landing zone on the disk surface. The landing zone is typically an area on the storage medium where no data is recorded. Such a disk drive is referred to as a contact-start-stop type disk drive.

In the aforementioned contact-start-stop type disk drive, there is a possibility that adhesion of the head slider to the surface of the data area or movement of the head slider to the data area due to shock will cause scoring and galling of the disk surface. A type of HDD that is designed to avoid such a problem is called a load/unload HDD. The load/unload type disk drive is equipped with a specialized loading/unloading mechanism. The loading/unloading mechanism includes a head holding mechanism that comprises a suspension assembly for a head arm, and a component called a ramp block that is included within the disk drive.

During periods of non-activation of the disk drive, the loading/unloading mechanism unloads the head slider to a predetermined "save position" on a ramp block such that that the slider avoids contact with the disk surface. This is accomplished by holding the suspension assembly at the save position on the ramp block. The aforementioned suspension assembly is provided with a tab having a protruding portion, and the aforementioned ramp block is provided with a ramp. The ramp block is disposed so that the ramp is located near the outer circumference of the disk. Upon deactivation of the disk drive, the loading/unloading mechanism unloads the head slider by retracting the head arm toward the ramp block and placing the protruding portion of the tab of the suspension assembly on the tab-holding flat surface of the ramp.

Upon activation of a load/unload type disk drive, the head is loaded after the rotation of the storage medium has become stable. This stability is achieved when a motor that rotates the storage medium has achieved an electrical steady state after being started. The determination of rotation stability requires recognizing the point in time at which the loading coincides synchronously with servo information written to the storage medium (called servolock).

For disk drives in which the rotational speed of the storage medium is 10,000 rpm or greater, and furthermore, for disk drives having a large number of storage media and heads, the head sliders will be subjected to air resistance as soon as they are loaded to the storage media, and consequently, the rotation load on the aforementioned motor will rise abruptly. Without compensation for this abrupt rise in load, the rotational speed of the aforementioned motor will decrease abruptly. A control band is normally provided for providing stable rotation control with respect to an abrupt increase in current.

To achieve the aforementioned control band, a disk drive utilizes a three-phase DC servomotor. with respect to a three-phase DC servomotor, two of three coils conduct, that is, two phases become conducting phases, and the remaining phase is non-conducting, or "off". When a back electromotive force is detected in the OFF phase,—the conducting phase is switched. A sharp current change occurs when the conducting phase is switched, resulting in additional operating noise from the motor. To solve this problem, a current slew rate is adjusted so that a rise and a fall in the phase current is less pronounced when the phase current is switched. However, if such a current slew rate adjustment is performed in the absence of an actual shift in current, while the detection of a back electromotive force can be performed accurately, the time during which current does not flow with respect to the OFF phase is shortened, resulting in a current flow with respect to the OFF phase, i.e., "kick back" that occurs as soon as current changes. For a load/unload type disk drive, this "kick back" will increase and a back electromotive force will be detected at incorrect timing, because a sharp increase in current becomes necessary if the head slider is loaded to the storage medium, as described supra. As a consequence, it becomes difficult to precisely control rotation of the aforementioned motor.

From the foregoing it can be appreciated that a need exists for a system and method that ensures stable rotation control of a disk drive servo motor during periods of abrupt load fluctuations.

SUMMARY OF THE INVENTION

A system and method for providing rotation control stability within a disk drive are disclosed herein. In accordance with the system of the present invention, a disk storage medium on which information is recorded is driven to rotate by a multiphase-phase DC servomotor. An actuator is utilized for loading and unloading the head to and from the disk storage medium. A load/unload controller commands the actuator to load or unload said head. In order to effectively compensate for an abrupt change in load on the servomotor caused by loading the head onto the disk storage medium, a slew rate switching unit is utilized to alter a slew rate of current supplied to the three-phase DC servomotor, based on a loading start command issued by the load/unload controller.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
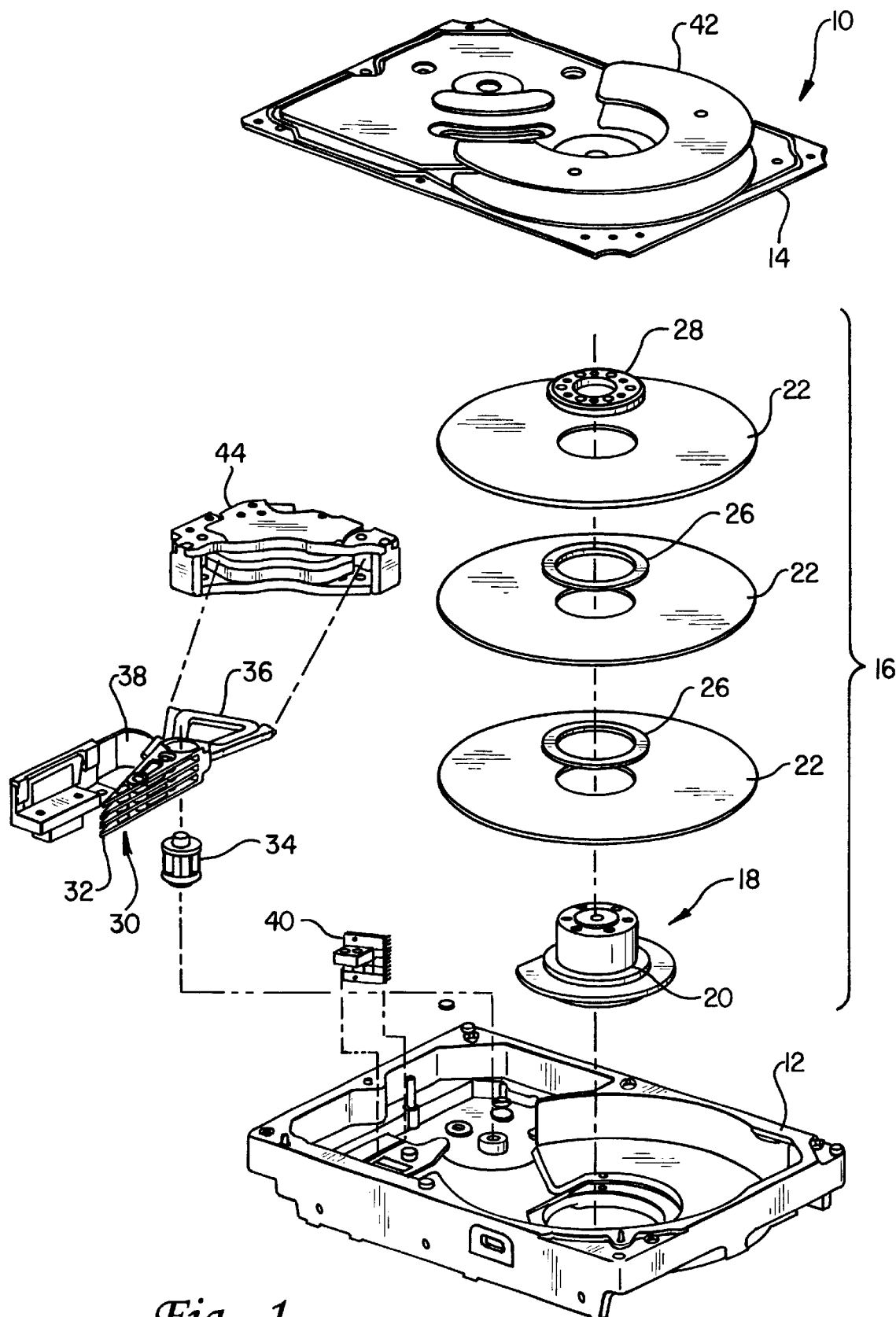
FIG. 1 is an exploded perspective view illustrating a hard disk drive in which an embodiment of the present invention may be advantageously implemented.

The present invention provides a system and method for switching a servo current slew rate in connection with loading applied to a spindle servo motor, thereby providing a disk drive and a control method thereof that are capable of overcoming an abrupt fluctuation in a load on the spindle motor caused, for example when the head is loaded upon activation of the drive. In accordance with system and method of the present invention, the object disk drive includes: a spindle motor that rotates at a predetermined speed; a disk storage medium that is driven to rotate by the spindle motor; a motor driver that controls rotation of the spindle motor and includes means for switching a current slew rate when a phase current is switched; and a head for reading or writing information from or to the disk storage medium. The motor driver including means for switching a slew rate in response to a phase current switch, makes it possible to switch a slew rate to overcome an abrupt fluctuation in a load on the spindle motor when the fluctuation occurs in the motor. The disk drive of the present invention is applicable to a load/unload type disk drive, wherein the disk drive is equipped with a load/unload mechanism that drives the head by an actuator equipped with a voice coil motor and loads or unloads the head to or from the disk storage medium.

In addition, current slew rate adjustment by the motor driver can be performed before the head is loaded to the disk storage medium. If the head is loaded to the disk storage medium, a load on the spindle motor will increase abruptly, as described above. For this reason, the slew rate is adjusted in advance. More specifically, the slew rate of a current that is supplied to the spindle motor is adjusted such that it becomes a rectangular or nearly rectangular waveform. In this way, even if there were an abrupt increase in current due to an increase in a load on the spindle motor, a back electromotive force in the spindle motor can be detected with proper timing.

As illustrated with reference to FIGS. 1–6, a preferred embodiment of the present invention is implemented utilizing a disk drive that includes a disk storage medium on which information is recorded; a three-phase DC servomotor for driving the disk storage medium to rotate; an actuator for driving a head to load or unload the head to or from the disk storage medium; a load/unload controller for commanding the loading or unloading of the head; and a slew rate switching unit (slew rate controller) for altering a slew rate of current that is supplied to the three-phase DC servomotor, based on a head loading start command issued by the load/unload controller. This disk drive is equipped with the load/unload controller that issues a command to load or unload the head, and based on a loading start command issued from this load/unload controller, the slew rate switching unit switches the slew rate of current to be supplied to the three-phase DC servomotor which is a motor for driving a disk storage medium. Therefore, in loading the head to the disk storage medium, the current slew rate can be reliably switched at appropriate timing.

Adjustment of the slew rate based on the head loading start command, or other spindle load-related signal, can be made by raising the slew rate. In connection with the embodiments described herein, "high" and "low" slew rates are depicted with reference to FIGS. 6A to 6D. The rectangular waveform shown in FIG. 6A indicates an absence of slew control. In the waveforms shown in FIGS. 6B to 6C, the angle of a rise (or the angle of a fall) with respect to time becomes decreased from FIG. 6B to FIG. 6C to FIG. 6D. As utilized herein, a slew rate with a larger rise angle is called a high slew rate and a slew rate with a small rise angle is called a low slew rate. Thus, the waveform shown in FIG. 6A in which no slew rate is controlled, has the highest slew rate. To reduce the operating sound of the spindle motor when rotation of a disk storage medium is in a steady state, generally the slew rate is held low. When an additional load is applied to the spindle motor, such as when the head is loaded, a low slew rate results in an a misleading back electromotive force being detected due to an abrupt increase in the current required to maintain rotation speed. For this reason, in the present invention, the slew rate is raised.

If the rotational speed of the three-phase DC servomotor becomes stable and goes to a steady state after the head has been loaded, lowering a raised slew rate is effective for a reduction in the operating sound from the spindle motor. For this reason, in the disk drive it is desirable that the three-phase DC servomotor include a rotational speed detector and the slew rate switching unit alter the slew rate, based on rotational-speed information from the rotational speed detector.

In accordance with the present invention, there is provided a method of controlling a disk drive that controls a multiphase DC servomotor for rotating a magnetic disk in a load/unload type disk drive at a predetermined speed, the method comprising the steps of: controlling the multiphase DC servomotor in a first current slew rate before loading of a head is started; and controlling the multiphase DC servomotor in a second current slew rate differing from the first current slew rate, before the head is loaded since loading of the head was started. After the multiphase DC servomotor has been controlled in the second current slew rate, it may be controlled by switching the second current slew rate to a third current slew rate differing from the second current slew rate. An example of this control method will be described with FIGS. 6A and 6D. While the spindle motor has been controlled in a low slew rate that is a first slew rate shown in FIG. 6D before loading of the head is started, it is controlled in a high slew rate that is a second slew rate shown in FIG. 6A (a slew rate without control) after loading of the head has been started. After it has been detected that the rotational speed of the magnetic disk has gone to a steady state, the high slew rate can be switched to a low slew rate that is a third slew rate shown in FIG. 6D. While, in this example, the first slew rate coincides with the third slew rate, the present invention is not limited to this. For instance, a slew rate of FIG. 6C, that differs from the first slew rate, may be employed as the third slew rate.

The load/unload type disk drive is equipped with a ramp to which a head for reading out or writing information from or to a storage medium is retracted during non-operation, and it is considered that a slew rate is switched during the time that the head is moving on the ramp. Therefore, in accordance with the present invention, there is provided a method of controlling a disk drive equipped with a ramp to which a head for reading out or writing information from or to a storage medium is retracted during non-operation and a motor for rotating the storage medium, the method comprising the step of supplying current, that is higher in slew rate than the original current supplied to the motor before rotation of the storage medium, to the motor, after rotation of the storage medium and during the time that the head is moving on the ramp for being loaded to the storage medium. In this control method, current with a high slew rate can be made into current with a rectangular or nearly rectangular waveform. In addition, the slew rate of current that is supplied to the spindle motor can be returned to the original slew rate after the head has been loaded. Furthermore, the rotational speed of the motor can be detected after the head has been loaded and the slew rate of current that is supplied to the motor can be lowered based on the rotational speed.

Although the disk drive and control method of the present invention is described herein with reference to a load/unload type disk drive, it should be noted that the present invention is not limited to the load/unload type disk drive. Additionally, even within the context of a load/unload type disk drive, the invention is not limited to loading/unloading of the head. It is a problem that an abrupt fluctuation in the load on the motor due to loading of the head causes an abrupt drop in the rotational speed of the motor. Hence, a generalized application of the present invention includes a method for controlling a spindle motor that includes the steps of: detecting a fluctuation in a rotational speed of the spindle motor; and altering a slew rate of current that is supplied to the spindle motor in response to detecting the fluctuation. This control method may further include a step of detecting that the rotational speed of the spindle motor has gone to a steady state and a step of returning the slew rate of the current being supplied to the motor to the original slew rate after the detection of the steady state. Similarly, the control method may further include a step of detecting that the rotational speed of the spindle motor has gone to a steady state and a step of lowering the slew rate of the current being supplied to the motor after the detection of the steady state.

With reference now to the Figures wherein like reference numerals refer to like and corresponding parts throughout, and in particular with reference to FIG. 1, a hard disk drive (HDD) 10 is illustrated in which a preferred embodiment of the present invention may be implemented. As shown in FIG. 1, HDD 10 includes a shallow box base 12 of aluminum alloy that is closed at its upper opening by a cover 14 to form an enclosure case 16. Enclosure case 16 is in the form of a thin rectangular box that is horizontally disposable within a computer or keyboard.

Brass cover 14 is screwed to base 12 through a rectangular frame-shaped seal member (not shown) so that enclosure case 16 is hermetically sealed. An acoustic plate 42 is disposed on the upper surface of cover 14. Acoustic plate 42 is a member for preventing noise within the enclosure case 16 from leaking to the outside.

Within enclosure case 16, a spindle motor 18 comprising a three-phase DC servomotor of hub-in structure is provided at a position slightly closer to the end than to the center of base 12. Three magnetic disks 22 comprising a glass substrate or aluminum substrate are fixed and mounted coaxially by a top clamp 28 through three sheets of spacers 26 on the upper surface of a hub 20 of the spindle motor 18. Magnetic disks 22 are driven to rotate by spindle motor 18 which may operate at a rotation speed of 10000 rpm or greater.

As further depicted in FIG. 1, enclosure case 16 includes an actuator 30 having magnetic heads 32 at one end, and having an intermediate portion that is supported on base 12 through a pivot 34. Pivot 34 allows actuator to freely rotate within enclosure case 16. The other end of actuator 30 includes a voice coil motor (VCM) coil 36, for driving actuator 30 in accordance with a signal from a VCM 44.

A card (not shown) may be utilized as a circuit board that may be attached to The outside surface (lower surface) of base 12. Such a card would have a rectangular shape and would be sized to cover the outside surface of base 12. Input/output electric power for driving the motor, signals, etc., are applied between the aforementioned card and spindle motor 18. Between the card and actuator 30, input/output motive power to the VCM coil 36, electric power to the magnetic heads 32 for reading, etc., and signals are applied. This input-output between the card and the actuator 30 is performed via a flexible cable (FPC) 38.

In the depicted embodiment, HDD 10 is a load/unload type disk drive. In accordance with conventional load/unload operating principles, HDD 10 unloads or retracts magnetic heads 32 to a "save position" on a ramp block 40 without magnetic heads 32 contacting magnetic disks 22. Magnetic heads 32 are held at the save position on ramp block 40 during periods of inactivity of HDD 10 (referred to hereinafter as "deactivation") During periods of activity of HDD 10 (activation periods), actuator 30 is driven and magnetic heads 32 are positioned over the magnetic disks 22. This positioning will be referred to hereinafter as head loading.

Figure 2:
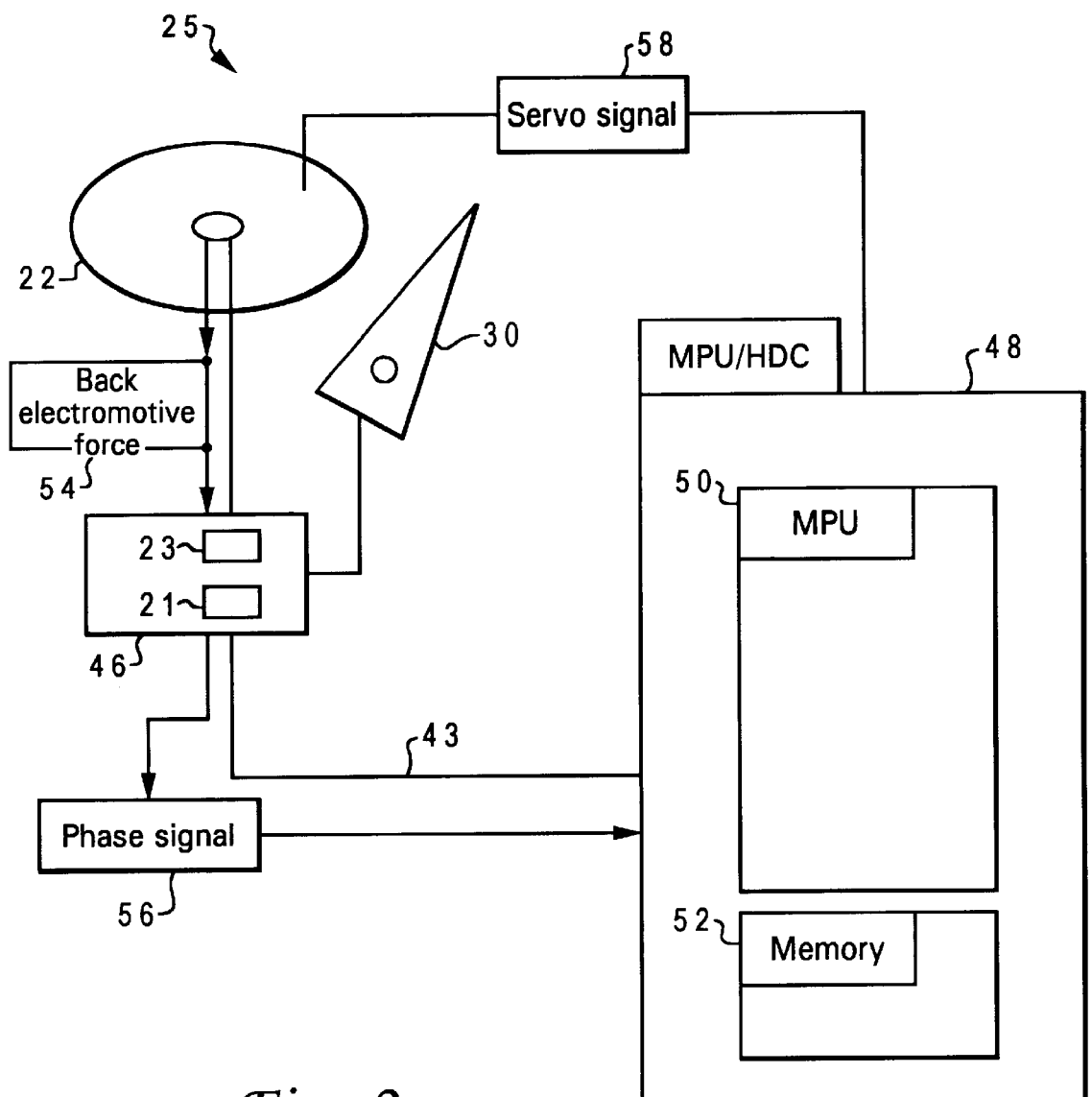
FIG. 2 is a block diagram depicting a system for stabilizing disk rotation control for the hard disk drive of FIG. 1 in accordance with one embodiment of the present invention.

Turning now to FIG. 2, there is illustrated a block diagram depicting a system 25 for stabilizing disk rotation control for HDD 10 in accordance with one embodiment of the present invention. As shown in FIG. 2, system 25 includes magnetic disks 22, actuator 30, a spindle driver 46 including spindle motor 18 for rotating magnetic disks 22, and an MPU/HDC (hard disk controller) 48. In the exemplary embodiment depicted in FIG. 2, MPU/HDC 48 implements loading/unloading control, as well as providing speed control of actuator 30, reading/writing of data with respect to the magnetic disks 22, etc. HDD 10 is equipped with a load/unload mechanism, that loads the head sliders over the magnetic disks 22 when operation is started and unloads the head sliders from the magnetic heads 22 to the save position when operation is stopped.

Magnetic disks 22 are driven to rotate on the spindle shaft of spindle motor 18 when HDD 10 is activated, and are stopped when HDD 10 is inactive. Tracks, including a data area where data is recorded and a servo area where servo data has been recorded, are disposed coaxially on the surface of each magnetic disk 22.

Spindle driver 46 includes spindle motor 18, a back electromotive force detection circuit for detecting a back electromotive force from spindle motor 18 and VCM coil 36, and a switching unit 21 for adjusting the slew rate of current to be supplied to spindle motor 18. In accordance with a preferred embodiment of the present invention, slew rate switching unit 21 adjusts the slew rate of current to be supplied to spindle motor 18 in response to a head-loading start command from MPU/HDC 48.

Figure 6A:
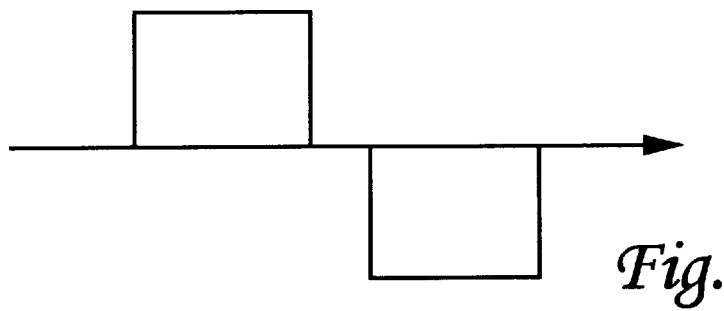
FIGS. 6A to 6D are diagrams illustrating various slew rates as applied to a current waveform in accordance with the teachings of the present invention.
Figure 6B:
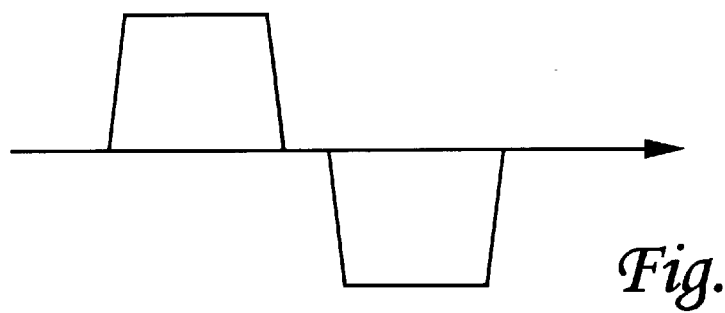

Adjustment of the slew rate may be accomplished by switching from a lower slew rate to a higher slew rate or vice versa. Turning to FIGS. 6A and 6B, there is shown in FIG. 6B an exemplary current waveform having a high s slew rate, while in FIG. 6D there is shown the a current waveform having a low slew rate. The loading/unloading mechanism generally has no special sensor for detecting the position and moving speed of the magnetic head 32, and the speed of actuator 30 is controlled by detecting a back electromotive force that occurs across both ends of VCM coil 36. That is, actuator 30 is driven by the VCM drive circuit, and when actuator 30 moves, a back electromotive force occurs across both ends of VCM coil 36. Therefore, if a back electromotive force occurring across both ends of VCM coil 36 is detected and controlled, it is possible to control the speed of the head when it is loaded or unloaded. In addition, the back electromotive force in the OFF or non-conducting phase of the spindle motor 18 is detected, and based on that timing, the ON or conducting phase is switched in sequence.

When magnetic head 32 is over the magnetic disk 22, a signal indicating the position of head 32 is input to MPU/HDC 48. In accordance with an important feature of the present invention, when magnetic head 32 is loaded or unloaded, a back electromotive force is detected by a counter-electromotive-force detection circuit 23 inside the VCM/SPINDLE DRIVER 46 is input to MPU/HDC 48.

As further illustrated in FIG. 2, MPU/HDC 48 comprises a HDC and an MPU 50. The HDC controls read and write operations, etc., with respect to magnetic disks 22, and MPU 50 performs speed control of actuator 30. In the depicted embodiment, the MPU also performs loading/unloading control prior to the speed control. A memory device 52 stores microcodes as software or firmware, and based on these microcodes, MPU 50 directs spindle driver 46 to switch a slew rate.

When the disk drive is deactivated, MPU/HDC 48 delivers an unload command resulting in driving current flowing to VCM coil 36 to retract actuator 30 such that magnetic head 32 is unloaded from the surface of magnetic disk 22 to the save position on ramp block 40. Conversely when the disk drive is activated, MPU/HDC 48 moves actuator 30 such that magnetic head 32 is loaded from the save position on ramp block 40 to a position over the surface of magnetic disk 22 that is now rotating. In accordance with one embodiment of the present invention, MPU/HDC 48 issues a slew rate switching command concurrently with its issuance of a head load start command.

MPU/HDC 48 also functions as a rotational-speed detector for detecting the rotational speed of spindle motor 18. That is, MPU/HDC 48 detects rotation from the phase-switching timing obtained by detecting a back electromotive force 54 in an OFF phase of the spindle motor 18. As previously explained, an "OFF phase" refers to a non-conducting coil with a DC servo motor. The phase-switching timing for switching conduction phases within a multi-phase DC motor is usually performed a plurality of times during one rotation of the spindle; this phase timing signal is divided to generate a phase signal pulse that occurs once during one rotation of the spindle; and rotational speed is detected by monitoring phase signal 56. If MPU/HDC 48 properly reads a servo signal 58, it can be determined that the loading of magnetic head 32 has been completed.

Figure 3:
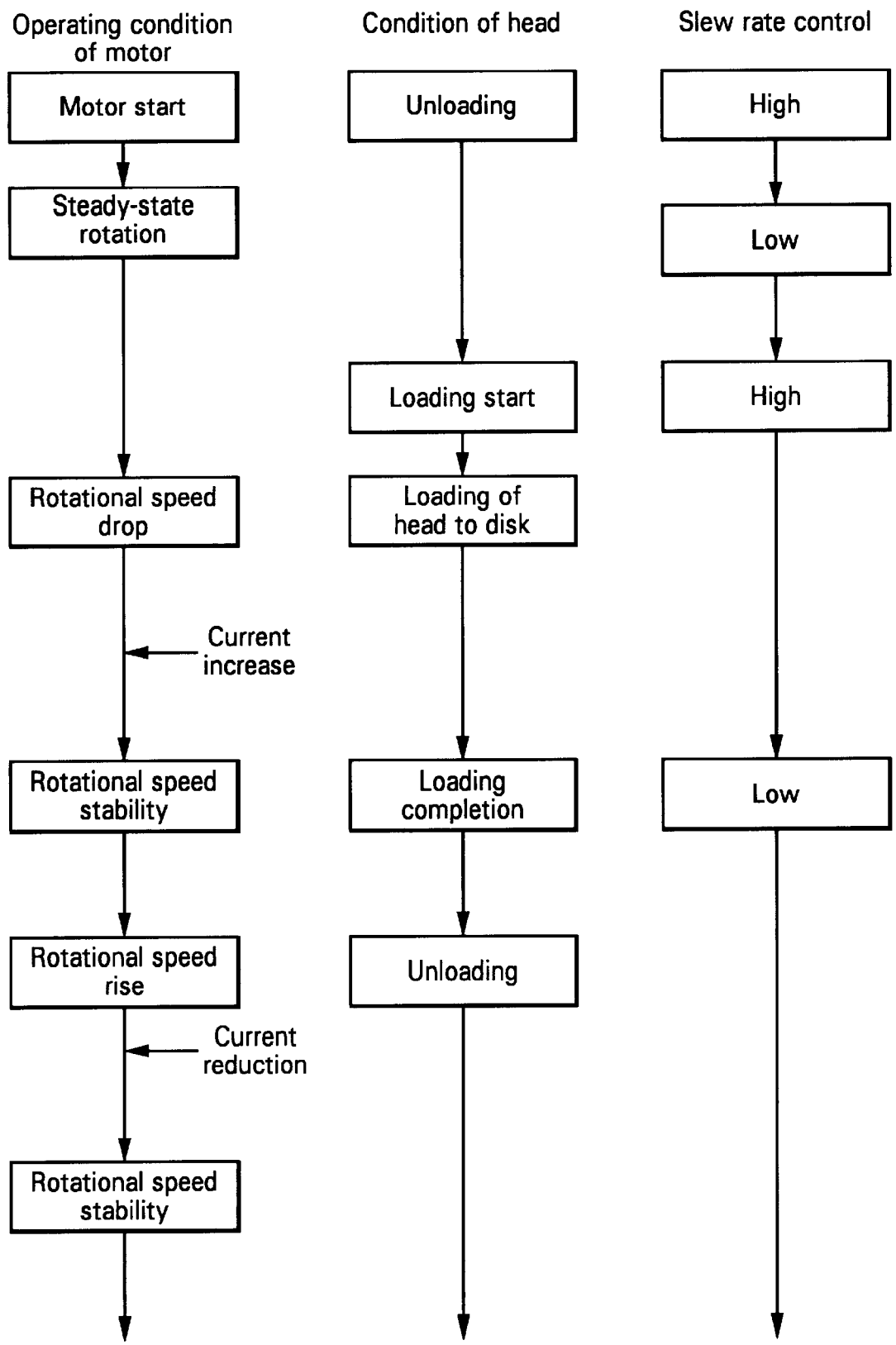
FIG. 3 is a flow diagram illustrating by comparison the operating condition of the motor, disposition of the head, and slew rate control in accordance with the embodiment shown in FIG. 2.

Next, the corresponding relationship between the operating condition of spindle motor 18, disposition of magnetic head 32, and slew rate control of the disk drive of the aforementioned configuration will be described with respect to FIG. 3 which is a flow diagram illustrating by comparison the operating condition of the motor, disposition of the head, and slew rate control in accordance with the embodiment shown in FIG. 2. Upon activation of spindle motor 18, current with a high slew rate (shown in FIG. 6B) is supplied to spindle motor 18 to aid spindle motor 18 to quickly achieve a steady state rotational speed. At this point, magnetic head 32 is in an unloaded condition on ramp block 40. Upon a determination based on the aforementioned phase signal 56, that the rotational speed of spindle motor 18 has gone to a steady state, spindle driver 46 switches the current from a high slew rate to a low slew rate (shown in FIG. 6D), based on a command from MPU/HDC 48. The primary object of this slew rate adjustment is to reduce an operating sound produced by spindle motor 18.

Next, in response to a head load start command sent from MPU/HDC 48 to VCM/spindle driver 46, actuator 30 begins to rotate to load of magnetic head 32. Simultaneous with the loading of magnetic head 32, the slew rate of current supplied to spindle motor 18 is switched from a low slew to a high slew rate. Upon placement of magnetic head 32 on the air bearing over magnetic disk 22, the rotational speed of magnetic disk 22 and thus the speed of spindle motor 18 is reduced. When the rotational speed is reduced, current to the spindle motor 18 is sharply increased by the servomechanism, in an attempt to maintain the rotational speed at a steady state. The slew rate is raised to counteract this effect by providing a proper back electromotive force from the spindle motor 18 that can be detected by back electromotive force detector 23.

Thereafter, if as detected based on the aforementioned phase signal 56, the rotational speed of spindle motor 18 has gone to a steady state, VCM/spindle driver 46 switches the slew rate for the spindle motor current from a high slew rate to the original low slew rate, based on a command from MPU/HDC 48. In this condition, the magnetic head 32 reads out or writes information from or to the magnetic disk 22, based on a command from the MPU/HDC 48. After completion of loading, the operating sound of the spindle motor 18 is reduced because the low slew rate is maintained as it is.

Thereafter, if a head unload command is delivered from MPU/HDC 48 to VCM/spindle driver 46, actuator 30 is retracted to the magnetic heads 32. Since the unloading of the magnetic head 32 reduces a rotation load on spindle motor 18, the rotational speed of spindle motor 18 rises accordingly. Accordingly, the current being supplied to spindle motor 18 decreases. However, drive operations are not effected by the fluctuation in the rotational speed after drive deactivation and thus rotation stability is not as important.

Figure 4A:
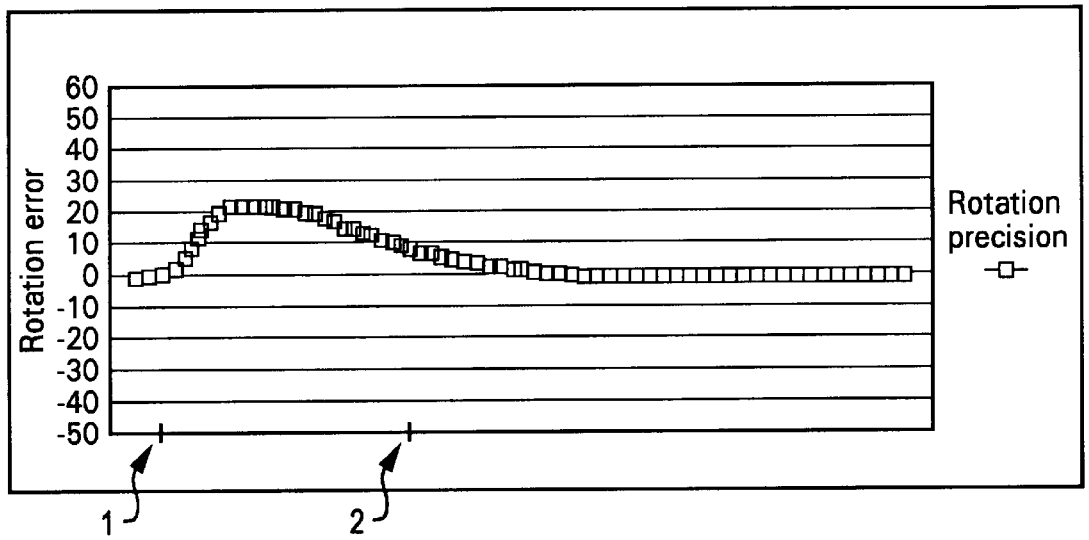
FIG. 4A is a graph depicting a servo motor rotation error resulting from implementing the servo rotation control shown in FIG. 3.
Figure 4B:
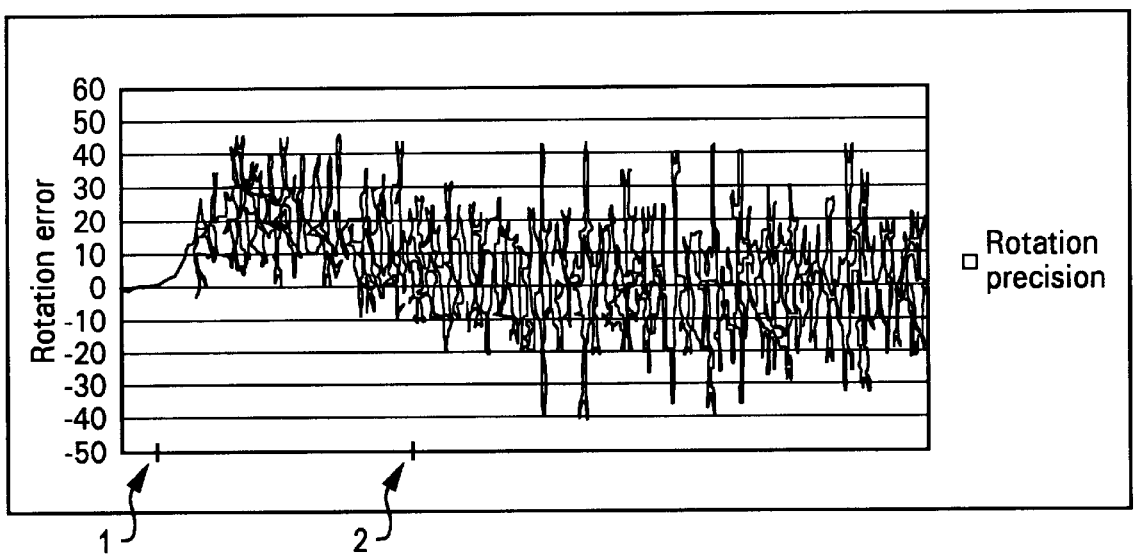
FIG. 4B is a graph illustrating a servo motor rotation error resulting from conventional hard disk drive rotation control.

FIG. 4 is a graph (the abscissas representing time and the coordinate axis representing a rotational speed error) showing an error fluctuation in the rotational speed of the spindle motor 18 due to loading of the magnetic head 32. FIG. 4A is a graph depicting a servo motor rotation error resulting from implementing the servo rotation control shown in FIG. 2;

FIG. 4B is a graph illustrating a servo motor rotation error resulting from conventional hard disk drive rotation control in which slew rate is maintained constant during head loading. In the graphs of FIGS. 4A and B, reference numeral 1 denotes the start time of loading and reference numeral 2 denotes the time at which loading is completed.

It should be noted that FIGS. 4A and 4B both illustrate the tendency for a rotation error in spindle motor 18 to become greater after the start of loading and smaller after the completion of loading. It should also be noted that the error signal resulting from implementing rotation stability control in accordance with the present invention as shown in FIG. 4A, rotation control is maintained with relative stability, while in the case depicted in FIG. 4B, the rotation error fluctuates greatly and the rotation precision of the spindle motor 18 is extremely unstable.

Thus, the embodiment illustrated with reference to FIG. 3, in which the slew rate is switched in connection with the loading and unloading of the magnetic heads 32, is therefore capable of reducing the operating sound of the spindle motor 18 during steady-state rotation and precisely controlling the spindle motor 18 in loading the magnetic heads 32.

Figure 5:
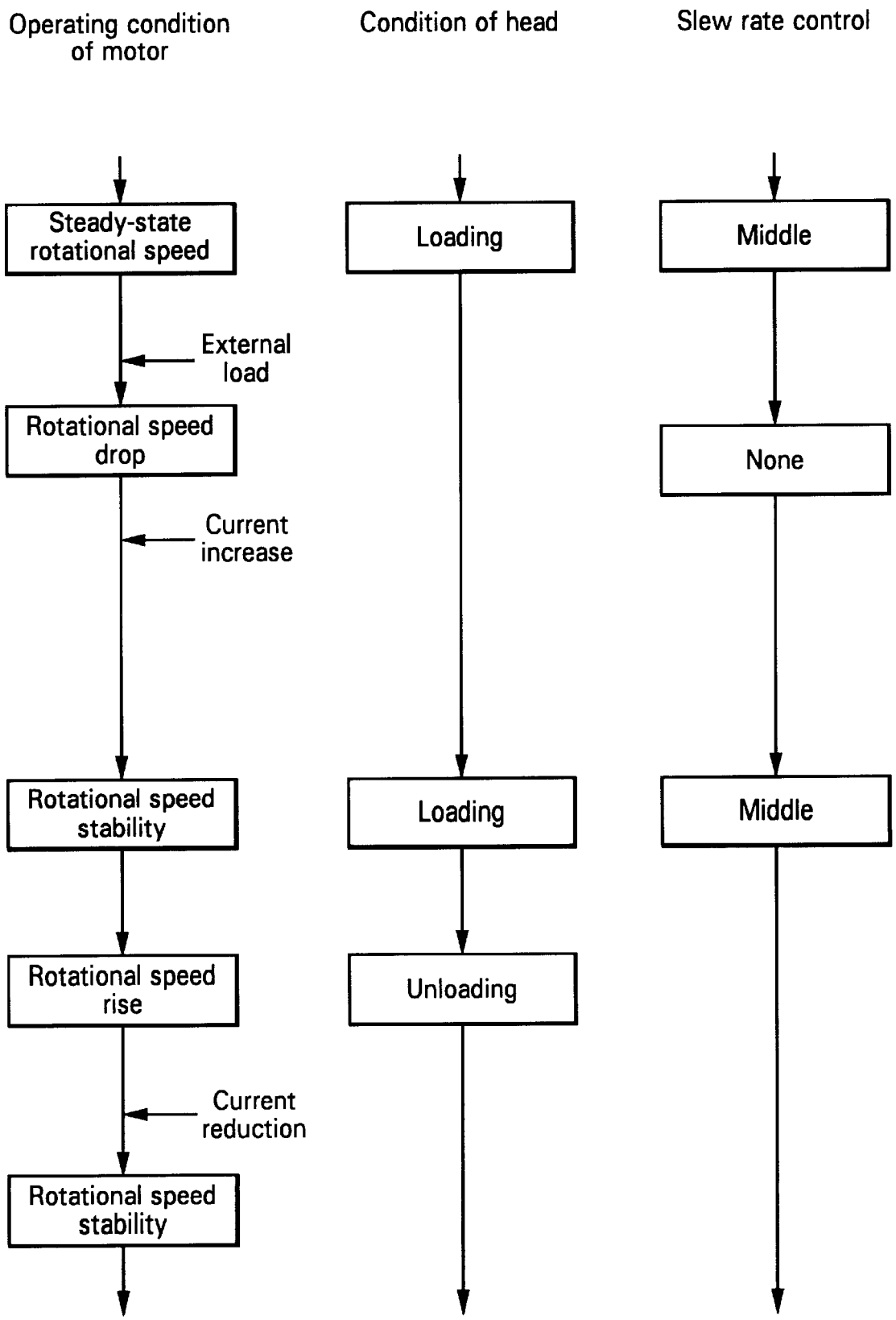
FIG. 5 is a flow diagram depicting by comparison the operating condition of the spindle motor, disposition of the head, and slew rate control in accordance with an alternate embodiment of the present invention.

Although the description of the embodiment described with reference to FIG. 3 includes switching the slew rate in response to loading and unloading of magnetic heads 32, it should be noted that the switching of the slew rate in alternate embodiments is not limited to a context of loading and unloading of magnetic heads 32. In this regard, FIG. 5 is a flow diagram depicting by comparison the operating condition of the spindle motor, disposition of the head, and slew rate control in accordance with an alternate embodiment of the present invention. As for FIG. 3, the embodiment depicted in FIG. 5 is assumed to occur in the context of HDD 10.

It is assumed in FIG. 5 that spindle motor 18 has been started and that magnetic heads 32 have been loaded. It is further assumed that current has been controlled in a middle slew rate shown in FIG. 6C. If an abrupt load, that results from external factors, is exerted on spindle motor 18 when the rotational speed of spindle motor 18 is in a steady state, the rotational speed will decrease and the supply of current to spindle motor 18 will increase abruptly to maintain the rotational speed. The reduction in the rotational speed of the spindle motor 18 is detected based on the aforementioned phase signal 56, and based on the result of detection, the current with the middle slew rate is switched to a rectangular waveform (higher slew rate), shown in FIG. 6A, where no slew rate control is performed. Next, the rotational speed of spindle motor 18 is continuously detected, and if it is detected that the rotational speed has been returned to a steady state, the slew rate without control is switched to the middle slew rate again. Thereafter, if an unloading command is delivered from MPU/HDC 48 to VCM/spindle driver 46, actuator 30 is retracted to unload the magnetic heads 32. Since the unloading of the magnetic heads 32 causes a load on the rotation of spindle motor 18 to decrease, the rotational speed of the spindle motor 18 increases conversely, compared with the loading of magnetic heads 32. Accordingly, the current being supplied to spindle motor 18 decreases. Thereafter, the rotational speed of spindle motor 18 returns to a steady state.

According to the aforementioned second embodiment, even if rotation of spindle motor 18 fluctuated due to external factors, the rotational speed thereafter can be controlled precisely. In addition, since current has the middle slew rate during steady-state rotation, the operating sound of spindle motor 18 is reduced. In this embodiment, while switching to the original middle slew rate has been made after the rotational speed has returned to a steady state, switching to the aforementioned low slew rate can also be made.

Figure 6C:
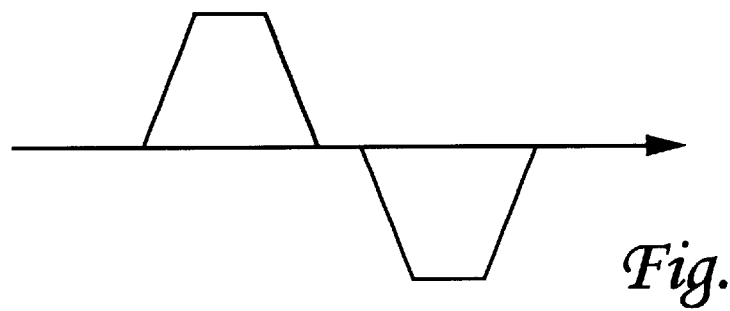
Figure 6D:
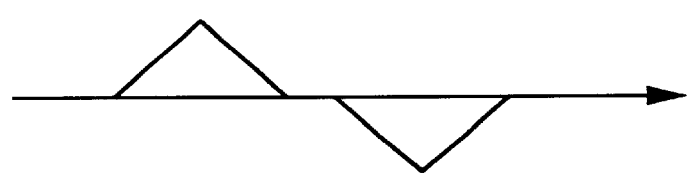

As described above, there are four slew rates in the aforementioned embodiments: a slew rate without control shown in FIG. 6A, a high slew rate shown in FIG. 6B, a middle slew rate shown in FIG. 6C, and a low slew rate shown in FIG. 6D. The "high," "middle," and "low" will be sufficient if they are relatively grasped, and as one index based on experience of the present inventors, etc., each slew rate can be specified by the following equations. For instance, when the rotational speed of the motor is 10000 rpm (10 Krpm), the high slew rate becomes 1.5 mA×10=15 mA/usec (+20%). Since the following equations are merely an index, they should not limit the slew rates employed in the present invention.

| | |
|---|---|
| Slew rate without control: | 2 mA × rotational speed (Krpm)/µsec ± 20% |
| High slew rate: | 1.5 mA × rotational speed (Krpm)/µsec ± 20% |
| Middle slew rate: | 1 mA × rotational speed (Krpm)/µsec ± 20% |
| Low slew rate: | 0.5 mA × rotational speed (Krpm)/sec ± 20% |

The control method of the disk drive of the present invention is most effective when applied to the HDD 10 of the high rotation type where the rated rotational speed of the magnetic disk 22 is 7200 rpm or greater like 7200 rpm and 10000 rpm. The control method of the disk drive of the present invention, however, is not to be limited to the HDD 10 of the high rotation type. In addition, while it has been described that the embodiments are applied to a magnetic HDD 10, the present invention is not limited to this but is widely applicable to disk drives equipped with other disk storage media.

As has been described hereinbefore, the present invention is capable of reducing the operating sound of the spindle motor during steady-state rotation and precisely controlling the rotational speed of the spindle motor even when a load on the motor fluctuates, because the slew rate is switched in connection with a load on the spindle motor. In particular, the disk drive and control method of the present invention have the advantage that they are applicable to load/unload type disk drives and capable of reducing the operating sound of the spindle motor during steady-state rotation and precisely controlling the spindle motor when the heads are loaded.

While the invention has been particularly shown and described with reference to a preferred embodiment, it will be understood by those skilled in the art that various changes in form and detail may be made therein without departing from the spirit and scope of the invention.

What is claimed is:

1. A system for stabilizing rotation control of a disk drive, wherein said disk drive includes a spindle motor that rotates a disk at a predetermined speed in accordance with a spindle current, said system comprising:
   a head for reading or writing data stored on said disk;
   a head load mechanism for driving said head by an actuator equipped with a voice coil motor, wherein said head load mechanism loads or unloads said head to or from said disk;
   a load detector for detecting a change in load on said spindle motor; and
   a slew rate controller for adjusting a slew rate of said spindle current in response to said load detector detecting an abrupt change in load on said spindle motor, wherein said slew rate controller further comprises:
   means for detecting a head load command; and
   means for adjusting a slew rate of said spindle current in response to detecting said head load command.

2. The system of claim 1, wherein said load detector is a back electromotive force detector for detecting a back electromotive force on said spindle motor.

3. The system of claim 1, wherein said slew rate controller is incorporated within a motor driver that controls a rotation speed of said spindle motor.

4. The system of claim 1, wherein an adjustment of a slew rate by said motor driver is performed by shaping said spindle current into a rectangular or nearly rectangular waveform.

5. A system for providing rotation control stability within a disk drive, said system comprising:
- disk storage medium on which information is recorded;
- a three-phase DC servomotor for driving said disk storage medium to rotate;
- an actuator for loading and unloading said head to and from said disk storage medium;
- a load/unload controller for directing said actuator to load or unload said head; and
- a slew rate switching unit for altering a slew rate of current supplied to said three-phase DC servomotor, based on a loading start command issued by said load/unload controller.

6. The system of claim 5, wherein an alteration in said slew rate based on said loading start command is made by raising said slew rate.

7. The system of claim 5, wherein said three-phase DC servomotor performs rotational speed detection and said slew rate switching unit alters said slew rate, based on detected rotational speed information.

8. The system of claim 7, wherein an alteration in said current slew rate based on said rotational-speed information from said rotational speed detector is made by lowering said slew rate.

* * * * *